Sept. 4, 1934.   M. H. SCHRENK   1,972,538
RECTIFIER SYSTEM
Filed July 5, 1929
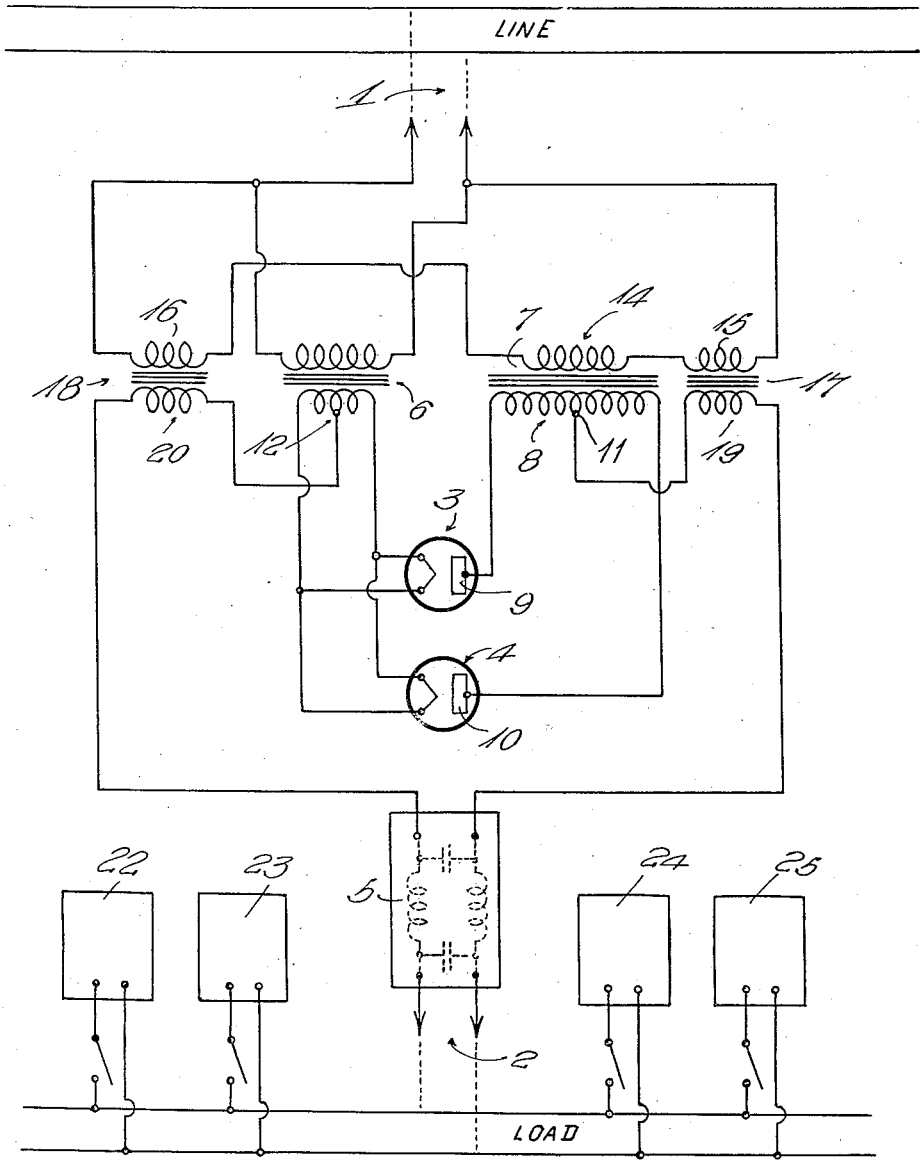
INVENTOR.
Matthew H. Schrenk,
BY
Harold Dodd.
ATTORNEY.

Patented Sept. 4, 1934

1,972,538

UNITED STATES PATENT OFFICE 1,972,538

RECTIFIER SYSTEM

Matthew H. Schrenk, Washington, D. C.

Application July 5, 1929, Serial No. 376,237

4 Claims. (Cl. 175—363)

My invention relates to a method and apparatus for providing an automatically regulated rectifier system.

An object of my invention is to provide a method for automatically maintaining the output of a rectifier system substantially constant.

Another object of my invention is to provide a method for preventing a variable load from causing a variable output from a rectifier system.

Still another object of my invention is to provide a rectifier system adapted to supply a variable load with substantially constant power.

A further object of my invention is to provide a rectifier system whose output direct current voltage will remain substantially constant with varying load.

A still further object of my invention is to provide a rectifier system having individual transformers connected in opposed relationship for coupling the supply circuit to the output circuit for controlling the input voltage in accordance with the output current without introducing appreciable ripple in the output current.

Other and further objects of my invention are to provide certain arrangements of the apparatus necessary to put in practice the combination employed in the rectifier systems of my invention, a better understanding of which can be had from the description set forth in the specification following and from the accompanying drawing which is a schematic circuit diagram illustrating the operation of my invention.

In most rectifier systems, it is the common experience that the output voltage of the rectifier drops as the load increases. This may be attributed to many different factors well known to those skilled in the art. The saturation of the rectifier tube is an important factor in the use of thermionic tubes. The resistance of the windings of the transformers, and the current carrying capacity of the filter circuit when one is employed, are all factors which deserve consideration. To mention a third and perhaps most common of all considerations, is that of variations in the line voltage or the voltage to be rectified by the rectifier system. Thus a feeder transformer may be operating at full capacity when additional load circuits are connected to the line. This is oftentimes noticed where the load on the feeder transformer remains substantially constant but the load on other transformers connected with the same feeder is varied. The rectifier system of my invention therefore introduces a means for controlling or maintaining constant the voltage of transmission lines and the like and is not limited to a regulating system for the rectifier system in itself. The system of my invention may be caused to maintain constant the line voltage or the output voltage where variable load circuits ordinarily cause such voltages to vary.

In the accompanying drawing the rectifier system of my invention is shown in schematic form for the purpose of explaining the method and operation employed. The terminals 1 are connected to the alternating current to be rectified. The rectified alternating current is delivered to the load circuit by terminals 2. The rectifier tubes 3 and 4 are shown as of the thermionic type, however any type of rectifier may be employed such as mercury arc, oxide metal disk, electrolytic or other suitable means. A filter circuit 5 may or may not be interposed between the rectifier proper and the load circuit depending upon the application of the rectifier system and the load circuit supplied. In the use of thermionic tubes as shown it is necessary to energize the cathode circuits. Suitable energy for this purpose is supplied by transformer 6. This source is not material and may be replaced by storage batteries and the like if so desired. The alternating current to be rectified is delivered to transformer 7, the secondary 8 of which is designed according to the voltage and current desired. The two ends of winding 8 are connected to anodes 9 and 10 of rectifier tubes 3 and 4 respectively. The arrangement is that of a full wave rectifier with modifications for preventing variations in the output circuit due to variations in the load. This is accomplished in accordance with my invention by providing transformers 17 and 18 which may be of similar design.

The transformers 17 and 18 may have core members of silicon-iron, nickel-iron or the like and properly designed so as to normally operate near magnetic saturation.

Winding 20 of transformer 18 is connected in series with the positive terminal 12 of the rectified current and the load. Winding 16 of transformer 18 is connected in series with the windings 14 and 15 of transformers 7 and 17 respectively and the line terminals 1. Since windings 15 and 16 are disposed oppositely with respect to winding 14 and windings 19 and 20 are disposed on opposite sides of the output circuit it follows that the alternating current component introduced by transformer 17 will be neutralized by the alternating current component introduced by transformer 18 and vice versa. The alternating current components are equal and opposite in effect. Since winding 20 of transformer 18 is connected in series with the output circuit of rectifier 9—10 as is also winding 19 of transformer 17 it is obvious that the increase of current through one of these windings will be accompanied by a corresponding increase of the current in the other winding. In a similar manner both transformers are operated near the saturation point of their respective core members.

The inductance values of windings 15 and 16 of transformers 17 and 18 respectively are correspondingly reduced as the magnetic flux in the respective core members approaches saturation, the potential drop across windings 15 and 16 will be correspondingly reduced and the potential subjected to winding 14 will be of a correspondingly higher order. Should the current through windings 19 and 20 reduce in value, the effect of the iron core members of transformers 17 and 18 would cause an appreciable increase in the inductance values of windings 15 and 16 and effect a greater potential drop across these windings resulting in winding 14 being subjected to potential of a correspondingly lower order. This in turn would reduce the potential applied to anodes 9 and 10 of rectifier 3—4 and the output current would return to normal.

The filter 5 should be connected between the load and the compensating transformers 17 and 18, as shown in the figure. If the compensating transformers are connected between filter and load, larger ripple will be present in the load current.

I realize that many modifications of my invention are possible without departing from the spirit of my invention. Any suitable type of rectifier may be employed. The rectifier system may be other than for single phase alternating current, the compensating arrangement being modified accordingly. It is to be strictly understood that the embodiments of my invention are not to be restricted by the foregoing specification or by the accompanying drawing but only by such restrictions as are imposed by the appended claims.

What I claim as new and desire to secure by Letters Patent of the United States is as follows:

1. In a rectifier system, an alternating current supply circuit, a direct current load circuit, a rectifying device, input and output circuits therefor, connections between said input circuit and said supply circuit, a pair of transformers operating near the point of magnetic saturation and having their primaries electrically connected in series in said supply circuit and having their secondaries connected in series in said output circuit and disposed in phase opposition, said transformers operating to vary the effective inductance of the supply circuit in accordance with the output circuit.

2. In a rectifier system, an alternating current supply circuit, a direct current load circuit, a filter for suppressing undesired current components, a rectifying device, input and output circuits therefor, said input circuit being in electrical relation with said supply circuit, a pair of transformers operating near the point of magnetic saturation and having their primaries connected in said supply circuit and one of said transformers having one terminal of its secondary connected to the output terminal of said rectifying device, the other of said transformers having one terminal of its secondary connected through the alternating current supply circuit to the input terminal of said rectifying device, the other terminals of the secondaries of said transformers being respectively connected to the input terminals of said filter, the output terminals of said filter being connected to said load circuit, said secondary windings being connected in phase opposition.

3. In a rectifier system, an alternating current supply circuit, a direct current load circuit, a pair of rectifier tubes, an input transformer having a primary winding connected to said supply circuit and having a secondary winding with a mid-tap, the terminals of said secondary winding being respectively connected to the anodes of said rectifier tubes, a pair of compensating transformers operating near the magnetic saturation point and having their primaries connected in said supply circuit and one of said compensating transformers having one terminal of its secondary connected to the cathodes of said rectifier tubes, the other of said compensating transformers having one terminal of its secondary connected to the mid-tap of the secondary of said input transformer, the other terminals of the secondaries of said compensating transformers being respectively connected to the terminals of said load circuit, the secondary windings of said compensating transformers being connected in phase opposition.

4. In a rectifier system, an alternating current supply circuit, a direct current load circuit, a filter for suppressing undesired current components, a pair of rectifier tubes, an input transformer having a primary winding connected to said supply circuit and having a secondary winding with a mid-tap, the terminals of said secondary winding being respectively connected to the anodes of said rectifier tubes, a pair of compensating transformers having their primaries connected in said supply circuit and one of said compensating transformers having one terminal of its secondary connected to the cathodes of said rectifier tubes, the other of said compensating transformers having one terminal of its secondary connected to the mid-tap of the secondary of said input transformer, the other terminals of the secondaries of said compensating transformers being respectively connected to the input terminals of said filter, the output terminals of said filter being connected to said load circuit, said secondary windings of said compensating transformers being connected in phase opposition.

MATTHEW H. SCHRENK.